United States Patent [19]
Hankins et al.

[11] 3,802,785
[45] Apr. 9, 1974

[54] LUMINANCE DISTRIBUTION PHOTOMETER

[75] Inventors: Harold Charles Arthur Hankins, Glossop; Ian Malcolm Roberts, Bow Lane, both of England.

[73] Assignee: International Computers Limited, London, England

[22] Filed: Sept. 15, 1972

[21] Appl. No.: 289,719

[30] Foreign Application Priority Data
Sept. 15, 1971 Great Britain.................... 42901/71

[52] U.S. Cl.............. 356/225, 250/237 R, 356/219, 356/233
[51] Int. Cl............................. G01j 1/44, G01j 1/40
[58] Field of Search .......... 356/218, 219, 225, 233, 356/121, , 126; 250/229; 250/237 R

[56] References Cited
UNITED STATES PATENTS
3,706,498   12/1972   Peacher............................. 356/218

Primary Examiner—Ronald L. Wibert
Assistant Examiner—V. P. M. McGraw
Attorney, Agent, or Firm—George R. Douglas, Jr.; Misegades, Douglas & Levy

[57] ABSTRACT

An optical system with a first lens system which produces at a first image plane a real image of an object and a second lens system for producing a real image of the exit pupil of the first lens system at a second image plane. A stop arrangement is provided for controlling the region of the image of the object surface from which light can travel to the second plane. Conveniently the luminance of the object is detected at the second image plane by suitable luminance detection means.

9 Claims, 1 Drawing Figure

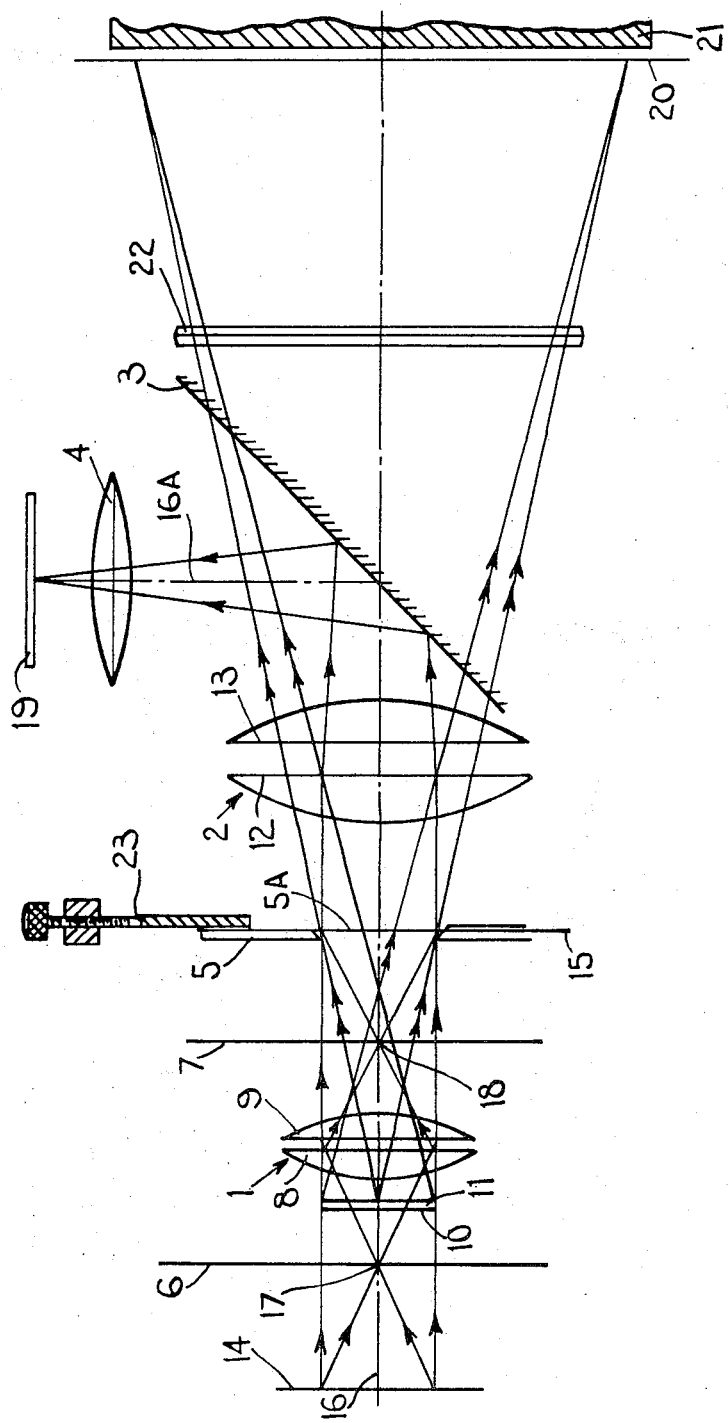

LUMINANCE DISTRIBUTION PHOTOMETER

BACKGROUND OF THE INVENTION

This invention relates to optical systems, and more particularly to optical systems for use with photometric apparatus.

THE PRIOR ART

Forms of photometric apparatus are known which are capable of comparing relative brightness of luminous areas and/or determining the brightness of relatively small luminescent areas. In practice, the known apparatus has not been found satisfactory for assessing the overall luminance or luminance distribution of relatively large surface areas. For example, the overall luminance or luminance distribution of a matrix of gas discharge devices, in which only certain areas have intrinsic luminosity.

SUMMARIES OF THE INVENTION

According to a first aspect of the invention there is provided an optical system including a first lens system for producing at a first predetermined position a real image of an object surface, a second lens system for producing a real image of the exit pupil of the first lens system at a second predetermined position, and means at said first position for selectively controlling the region of the image of the object surface from which light can travel to the second position.

In accordance with a second aspect of the invention there is provided a photometric apparatus including a first lens system for producing at a first predetermined position a first real image of a surface whose luminance is to be examined, a second lens system for producing a second real image of the exit pupil area of the first lens system at a second predetermined position; selectively adjustable stop means for controlling the region of the first image from which light can travel to the second position, and means for detecting the luminance of the second image.

Preferably, the detecting means includes a photomultiplier device.

Conveniently, the adjustable stop means includes a movable edge defining element adapted for translatory movement across the aperture formed by the stop. If desired the edge can be replaced by a slit.

A further aspect of the present invention provides an optical system including an object lens for producing at a first image plane a real image of an object surface, a field lens having an optical axis common to that of the object lens for producing an image of the exit pupil of the object lens at a second plane intersecting the optical axis; aperture means at said first image plane for controlling selectively the region from which light emanating from the object position can travel to the second plane; a semi-reflecting surface interposed in the light path between the field lens and the second plane for directing a portion of light from the field lens along a second optical axis inclined to the first mentioned optical axis, and a further lens so positioned on the second optical axis that said first image plane serves as the object surface for the further lens, the further lens being such as to produce a real image of the first image plane at a further image plane.

BRIEF DESCRIPTION OF THE DRAWING

For better understanding of the invention and to show how the same may be carried into effect reference will now be made to the accompanying drawing which is a schematic ray diagram representation of an optical system incorporating the present invention.

DESCRIPTION OF THE PREFERRED EMBODIMENT

The optical system illustrated includes an objective 1; a field lens 2; a partially reflecting mirror 3; a converging lens 4, and an aperture plate 5.

In the following description the front to rear of the lens component positioning will be considered to be in the direction from left to right of the FIGURE.

The objective 1 has front and rear focal planes 6 and 7 and is figured so that the principal planes 8 and 9 are closely adjacent and are crossed whereby the rear principal plane 8 lies at the front side of the objective and the front principal plane is located at the rear side of the objective. Similarly, the pupils of the objective 1 are closely adjacent and are crossed so that exit pupil 10 is positioned to the front side of the entrance pupil 11 of the lens 1.

The field lens 2 has a rear principal plane 12 and a front principal plane 13 which are spaced further apart than the corresponding planes of the objective 1.

In the drawing the object plane for the system is represented at 14. Light leaving the plane 14 is imaged by the objective 1 at the image plane 15 of the objective 1. The aperture plate 5 is positioned at the plane 15. The plate 5 has a rectangular aperture 5A.

Light leaving the object plane 14 intersects the optical axis 16 of the system at a point 17 in the focal plane 6 passes through the objective 1 and intersects the optical axis 16 at a point 18 in the focal plane 7 to produce at the image plane 15 an image of the object, the magnification being unity. The light crossing the image plane 15 passes through the aperture 5A and the field lens 2 to be incident upon the partially reflecting surface 3. Part of this light is reflected towards the converging lens 4, which latter produces on a ground glass screen 19 a real image of the image produced at the plane 15 by the objective 1.

The field lens 2 is so positioned with respect to the objective 1 that the exit pupil 10 of the objective 1 acts as the object for the lens 2 whereby the lens 2 forms a real image of the exit pupil 10 at a plane 20, the light forming this particular real image being that which passes through the partially reflecting mirror 3.

The above described optical system is particularly suitable for use as a photometer, and is readily applicable to a photometer that is capable of measuring the distribution of luminance across an extended area; for example, an area whose dimensions are 30 m.m. by 30 m.m. When applied to a photometric application the light source whose luminance is to be examined is positioned at the object plane 14. The light reflected upwards by the mirror 3 to the lens 4 along a second optical axis 16A and imaged on the screen 19 enables the object surface under examination to be visually monitored.

Light passing through the mirror 3 is imaged by the field lens 2 at the plane 20. In a practice embodiment the lens 2 produces a magnification of approximately four times.

A photomultiplier 21 having its photocathode located at the plane 20 is provided for measuring the intensity of the light at the plane 20.

Filters 22 are introduced into the optical path of the light transmitted by the mirror 3 so as to balance or correct the spectral response of the optical system to the photo-optic response.

The plate 5 serves as a fully flashed aperture in so far as the plane 20 is concerned so that the intensity of illumination of the image formed at the plane 20 is proportional to the luminance of the object surface located at the object plane 15.

If it is desired to investigate the distribution of luminence across the object surface a knife edge 23 is positioned at the aperture 5A. The knife edge is conveniently movable across the surface of the plate 5 by means of a micrometer screw 24. In operation, movement of the edge 23 across the field defined by the aperture plate 5 progressively closes down the effective aperture whereby the region of the aperture from which light can travel to the photomultiplier 21 is varied. If the luminance is uniformly distributed across the aperture in the direction of movement of the edge 23 there will be a straight line relationship between the effective aperture (that part of the aperture through which light continues to pass) and the luminance indicated — this being the output of the photomultiplier 21. The curve resulting from graphical plot of the effective aperture area against change of photomultiplier output is characteristic of the distribution of light intensity across the surface of the object. By replacing the edge 23 by a slit, the distribution of the luminosity across the aperture will be directly deducible from the photomultiplier output.

It will be understood that while the system shown in the drawing is an 'in-line' system, it is possible by using suitable prisms or mirrors or the like to have a 'folded' optical system in which the image plane 20 and photomultiplier 21 can be located adjacent to the objective end of the system.

We claim:

1. An optical system including a first lens system for producing at a first predetermined image plane a real image of an object surface, a second lens system for producing a real image of the exit pupil of the first lens system at a second predetermined image position, means at the first position for selectively controlling the region of the image of the object surface from which light can travel to the second position, and means for detecting the luminance of the second image produced at said second predetermined position.

2. An optical system as claimed in claim 1, in which the exit pupil of the first lens system is located on the object side of the first lens system.

3. An optical system as claimed in 1 and including a first optical axis which is common to the first and second lens systems; a second optical axis inclined to the first axis; means for directing a portion of the light from the first system along the second optical axis; and a further lens system to produce from said light portion from the first lens system a real image of the image appearing at said first image plane.

4. An optical system as claimed in claim 3, in which the directing means includes a partially reflecting mirror, the arrangement of the mirror being such that light reflected therefrom provides said portion and the light transmitted therethrough is that imaged by the second lens system at the second predetermined position.

5. An optical system as claimed in claim 1, in which the means at the first position includes aperture defining means.

6. An optical system as claimed in claim 5, in which the aperture defining means includes an adjustable stop means.

7. An optical system as claimed in claim 6, in which the adjustable stop means includes a movable edge defining element adapted for translatory movement across the aperture formed by the stop.

8. An optical system as claimed in claim 1, in which the luminance detecting means includes a photomultiplier device.

9. An optical system as claimed in claim 5, in which the aperture defining means provides a fully flashed aperture in relation to the second predetermined image position whereby the intensity of illumination of the image formed at the second predetermined image position is proportional to the luminance of the object surface.

* * * * *